April 29, 1930.  G. W. ALDEEN  1,756,530
SPOTLIGHT
Filed Feb. 12, 1927
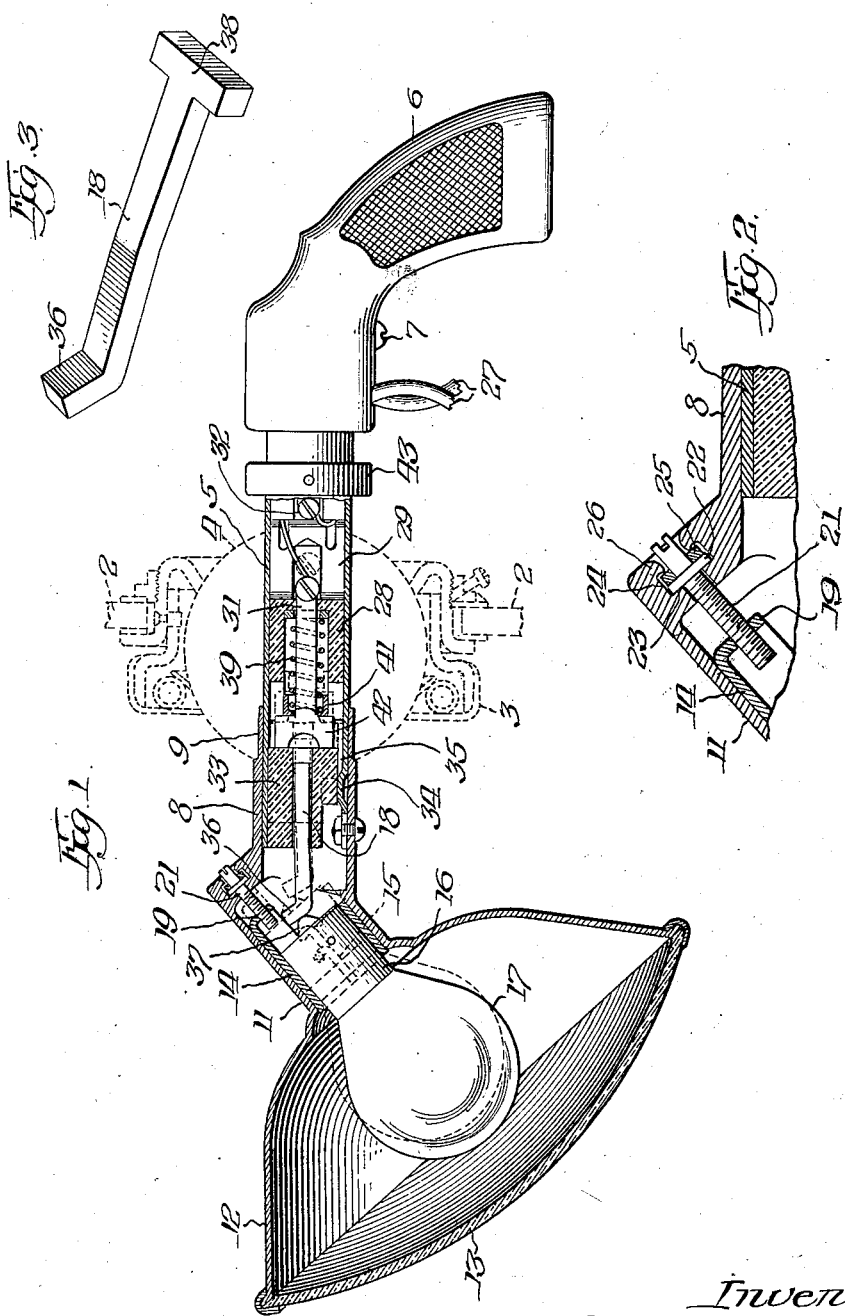
Witness:
Inventor:
Gedor W. Aldeen
By Ira J. Wilson
Atty.

Patented Apr. 29, 1930

1,756,530

UNITED STATES PATENT OFFICE

GEDOR W. ALDEEN, OF ROCKFORD, ILLINOIS, ASSIGNOR TO FYRAC MANUFACTURING CO., OF ROCKFORD, ILLINOIS, A CORPORATION OF ILLINOIS

SPOTLIGHT

Application filed February 12, 1927. Serial No. 167,633.

This invention relates to light projecting apparatus of various types, but more particularly to a spotlight adapted to be mounted in an automobile windshield so that the light may be manipulated from within the car for projection of the beam in any desired direction.

One of the primary objects of the invention is to provide a spotlight which will have a wide range of adjustment so that the beam of light may be swung through a wide arc and when in its extreme positions may be projected in a direction substantially parallel with the plane of the windshield for facilitating the picking up and reading of sign posts, house numbers and the like by the occupants of the car when such sign posts etc. are in a position perpendicular to the direction of the motion of the car. In this connection this application is a continuation in part of my copending application Serial No. 709,131, filed April 26, 1924.

Another object of the invention is to provide a novel arrangement for adjusting the position of the lamp with respect to the focus of a light reflecting member in conjunction therewith, whereby the beam may be narrowed for long distance projection, or broadened for short distance projection, or varied any other way for any desirable purpose.

A further object is to provide a novel electrical contact mechanism for lights of the above specified characters and one which will maintain electrical contact with the lamp base contact button regardless of the position to which the lamp may be adjusted by the focus adjusting device.

Many further objects including the details of construction, the arrangement and cooperative relation of parts, and the many advantages inherent in or accruing from the invention will be or should become readily appreciated after perusal of the following description and claims and after viewing the drawings in which:

Fig. 1 is a vertical longitudinal sectional view through a spotlight of the windshield type embodying my invention.

Fig. 2 is a fragmentary sectional view corresponding to the section of Fig. 1 with some of the parts broken away and drawn on a large scale to more clearly illustrate the focus adjusting mechanism, and Fig. 3 is an enlarged perspective view of a preferred form of contact making device.

As aforestated the light illustrated is a spotlight adapted for manipulation from within a car body and for such purpose is mounted in the car windshield designated 2 in a housing 3 which may be of any preferred construction, such for instance as that illustrated in my copending application Serial No. 692,795, filed February 15, 1924. Within this housing a ball or other spherical member 4 is mounted for substantially universal movement and as a tubular stem 5 passes diametrically through the ball 4 and is secured relatively thereto in any suitable manner, it follows that the stem partakes of the movements of the ball. It will be obvious, of course, that any other method of mounting the stem in the windshield or any other arrangement for obtaining substantially universal movement of the stem may be substituted for the corresponding parts illustrated.

A handle 6 is suitably mounted on one end of the tubular stem 5, that is, the end which projects from the mounting on the interior side of the windshield and is secured thereon by means of a screw 7 whereby the stem may be moved substantially universally. The opposite end of the stem is adapted to telescopically receive an elbow sleeve, bracket or lamp supporting member 8, one end of which is preferably reduced as shown at 9 for reception in a recess provided about the stem within the ball member 4 and the other end of which, 11, may either be integral with or suitably secured to a reflector 12 which is closed at its outer side by a lens 13. The bracket or elbow sleeve member 8 is hollow at both ends, at the end adjacent the reflector for the reception of a lamp base receiving socket 14 and at the other for the reception of the end of the tubular stem 5, as previously noted.

The lamp base receiving socket member 14 is provided with one or more bayonet slots 15 in the usual manner for engagement with projections formed on the sides of the lamp base 16 which is secured on the base of the lamp 17 and is slidably mounted within the end 11 of the sleeve or bracket 8 so that the position of the lamp 17 secured therein may be adjusted with respect to the focus of the reflector 12. For the purpose of moving the lamp base socket member 14 back and forth within the sleeve or bracket for adjustment the socket member is preferably formed of cup-shape with a segment of the bottom cut away for the purpose of providing an entrance for the end of a contact member generally designated 18, thereby leaving a portion which I shall term a lip 19, which is drilled and tapped for engagement with a screw 21 which is rotatably but longitudinally immovably secured in the bracket or sleeve 8, as more clearly shown in Fig. 2. The screw 21 is preferably provided with an integral collar 22 which bears at one side against a shoulder 23 formed at the end of a recess 24 and at its other side against a washer 25 held in the recess by suitably burring over outer portions of the walls of the bracket, as shown at 26. Other methods of securing the screw in position will occur to those skilled in the art and other means other than a screw may be utilized for effecting my purpose. As the screw is rotated in one direction or the other the lamp base receiving socket 14 will be slid back and forth within the end 11 of the sleeve or bracket and thereby adjust the lamp 17 and therefore the source of light to any desirable position with respect to the focus of the reflector.

It will also be noted from the foregoing that by reason of the angular relation of the axis of the end 11 of the sleeve or bracket 8 with respect to the axis of the stem 7 swinging movements of the stem by manipulation of the handle will correspondingly swing the reflector so that the axis of a beam of light projected by the reflector may lie in a plane substantially parallel the plane of the windshield or other member in which the light is mounted. Since the ball 4 in the present illustrated embodiment of the invention may be rotated about the axis of the stem by corresponding rotary movement of the handle, the axis of the beam of light may be directed with its axis in a plane parallel to the plane of the windshield and to any direction therein. This is the normal and desirable position of the light in any event, since the light is employed in city driving for illumination of the curb line, locating house numbers, street names and the like, and in country driving for illuminating the edge of the road, looking for signs at the sides of the road etc. Furthermore, projection of the light rays straight into the eyes of approaching drivers is not only undesirable but in many jurisdictions is prohibited by law. Consequently, the disposition of the light at an angle to the longitudinal axis of the stem permits the projection of the light beam along the right hand edge of the road without the necessity of moving the handle of the light into a position at a sharp angle to the windshield.

The light is not only normally disposed in the proper position for driving but the mounting of the light at an angle affords another and even greater advantage in that the range of the light is very materially increased. This will be apparent from an inspection of Fig. 1, from which it will be observed that when the light is angled by swinging the handle upwardly in the plane of the paper, that is, away from one, viewing the illustration in proper reading position, the light itself will be so disposed that the beam will be projected toward one and substantially parallel with the plane of the windshield 2. When it is desired to project the light in the opposite direction this may be readily accomplished by simply moving and rotating the handle through an angle of 180°.

Electric current for the lamp is supplied through wires 27 which pass through a suitable opening in the handle into a switch. This switch comprises a generally cylindrical block of insulation 28 rotatably mounted in the tubular stem 5 and cut away at one end, as shown at 29, so that the ends of the wires 27 may be suitably connected to contact elements 31 and 32 arranged in conjunction therewith, and a second substantially cylindrical block 33 of insulating material carrying contacting element 18 is slidably but non-rotatably mounted in the stem 5 through the interengagement of a depressed portion 34 of the stem with a slot 35 formed longitudinally in the block. The contact element 18 is preferably provided with a bent end 36 for sliding but continuous contact with the button contact 37 formed on the base of the lamp and at its opposite end is T-shape, as shown at 38 for a purpose which will hereinafter appear. The contact element 18 is secured in the block 33 in any suitable manner and moves therewith as the latter slides back and forth in the stem, as will become apparent. The contact element 31 is slidably mounted within an axial bore in the block 28 and is spring pressed outwardly by a spring 39 abutting between a cupped collar 41 and an internal shoulder formed in the bore of the block. The outer end 42 of the contact member 31 is forked as will be noted, so that when turned to the position illustrated in Fig. 1 by rotary movement of a switch collar 43 suitably connected to the block 28, the forked ends will straddle the T-head 38 of the element 18 and break the circuit, but when the switch collar 43 is rotated 90° from such position the forked ends of the element 31 makes contact with the T-head 38 of the element 18 and complete the circuit.

The spring 39, by reason of the construction and arrangement described above, serves several functions, one of which is to keep the contact element 31 in tight engagement with the contact element 18 or with the block of insulation 33, depending upon how it is disposed, and another of which is to keep the block 33 and contact element 18 in its farthest forward position within the sleeve like stem 5, as determined by the abutment of the end 36 of the element 18 with the button 37 on the lamp base. As the screw 21 is rotated to adjust the focus of the lamp a contact between the bottom 37 and contact element 18 will be maintained, the contact element 18 with the block 33 riding back and forth within the stem for this purpose.

From the foregoing it will be appreciated that I have provided a device attaining all of the objects specifically mentioned, as well as others corollary thereto and a device having many desirable advantages all of which may be attained by constructions and arrangements other than that illustrated and described herein. Consequently, I do not desire to be limited to the specific construction which I at present consider a preferred form of my invention, but only by the spirit of the invention and the scope of the appended claims.

I claim:

1. A device of the character described comprising, a reflector, a hollow elbow bracket having one arm extending from the rear of said reflector and secured relatively thereto and having another arm arranged at an oblique angle to the first arm, a lamp socket member slidably mounted in the first said arm, means engaged with said bracket for sliding said socket member back and forth in said bracket whereby to adjust the focus of a lamp with respect to said reflector, means mounted in said second arm slidable at an oblique angle to the axis of said socket member for maintaining electrical contact with a lamp carried by said socket during movements of the latter, and a spring in said second arm for urging said contact means toward said lamp.

2. A device of the character described comprising, a reflector having a lamp base receiving opening therethrough, means for supporting said reflector solely from the rear thereof, a lamp base receiving socket slidably connected to said supporting means and movable with respect to said reflector along the axis of said opening, means engaged with said supporting means for moving said socket along said axis relatively to said reflector, means including a hollow arm connected to the reflector supporting means for mounting the reflector in movable relation to a vehicle, means mounted in said arm slidable at an oblique angle to the axis of said socket for maintaining electrical contact with a lamp carried by said socket during movements of the latter, the axis of said arm being oblique to the axis of said socket, and a spring in said second arm for urging said contact means toward said lamp.

3. A device of the character described comprising, a reflector, a hollow elbow bracket having one arm extending from the rear of said reflector and secured relatively thereto and having another arm arranged at an oblique angle to the first arm, a lamp socket member slidably mounted in the first said arm, means engaged with said bracket for sliding said socket member back and forth in said bracket whereby to adjust the focus of a lamp with respect to said reflector, means mounted in said second arm slidable at an oblique angle to the axis of said socket member for maintaining electrical contact with an end electrode on a lamp carried by said socket during movements of the latter, and a spring in said second arm for urging said contact means toward said lamp.

4. A device of the character described comprising, a reflector having a lamp base receiving opening therethrough, means for supporting said reflector solely from the rear thereof, a lamp base receiving socket slidably connected to said supporting means and movable with respect to said reflector along the axis of said opening, means engaged with said supporting means for moving said socket along said axis relatively to said reflector, means including a hollow arm connected to the reflector supporting means for mounting the reflector in movable relation to a vehicle, means mounted in said arm slidable at an oblique angle to the axis of said socket for maintaining electrical contact with an end electrode on a lamp carried by said socket during movements of the latter, the axis of said arm being oblique to the axis of said socket, and a spring in said arm for urging said contact means toward said lamp.

In witness of the foregoing I affix my signature.

GEDOR W. ALDEEN.